United States Patent Office 3,009,360
Patented Nov. 21, 1961

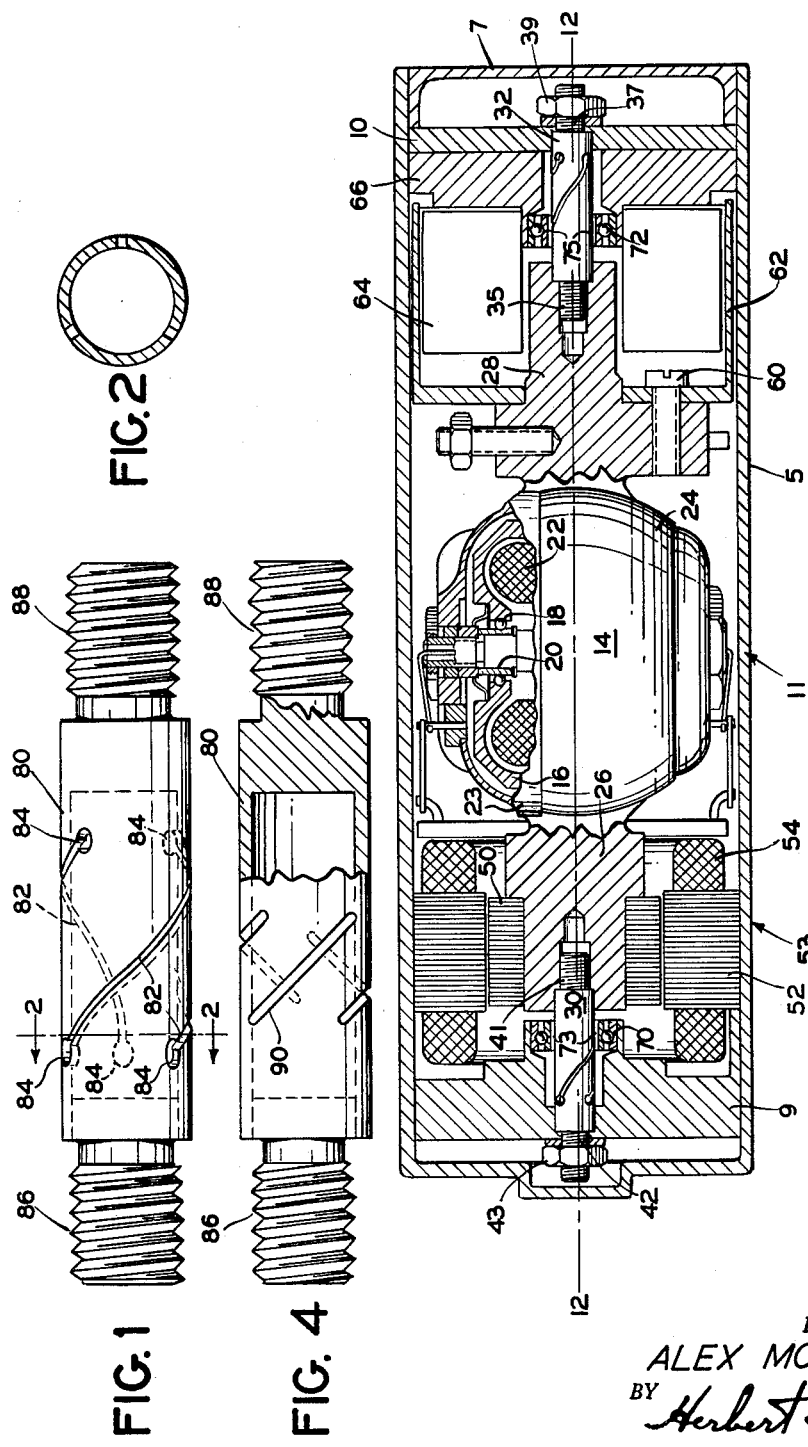

3,009,360
SLOTTED TUBULAR TORSION BAR SUSPENSION FOR AN ANGULAR RATE GYROSCOPE
Alex Morsewich, Wayne, N.J., assignor to The Bendix Corporation, a corporation of Delaware
Filed Apr. 29, 1960, Ser. No. 25,614
7 Claims. (Cl. 74—5)

This invention relates to an improved torsion bar suspension for an angular rate gyroscope and more particularly to a pair of novel slotted torsion bars arranged in supporting relation at opposite ends of an output shaft of a gimbal of a gyroscope, for example a rate gyroscope, and upon a frame or other part with reference to which angular displacement of the rotor axis in a definite plane is to be measured and which torsion bars are deformable about an axis normal to that plane as well as one of the bars being axially expansible while the other bar is axially contractable under such torsionally applied forces so as to resiliently centralize the moving gimbal assembly.

The conventional rate gyro is a device used to indicate or control angular rates of turn about its sensitive or input axis and a device having a single degree of freedom. There is further provided a gyro wheel supported in a gimbal so that its spin axis is perpendicular to the gimbal axis, i.e. the axis about which the gimbal rotates and called the precession or output axis. The sensitive or input axis is orthogonal to both the spin axis and the output axis while at opposite ends of the gimbal are a pickoff rotor and a damping device. The gimbal in such an arrangement is resiliently centralized and supported by torsion bars. In prior art torsion bars supported gyroscopes of the aforenoted type, it has been necessary to place the torsion bars in tension using a resilient diaphragm or similar device. An object of the present invention is to simplify such a torsion bar arrangement by providing both functions in a novel helical slotted torsion bar arrangement.

Another object of this invention is to provide a pair of novel torsion bars so arranged that a constant tension is applied by the torsion bars over small angular displacements and in which the arrangement is such that as one torsion bar increases in length the other must decrease in length an equal amount.

Moreover, since such torsion bars may be rotationally deformable, the bars may also be deformable to a small degree when subjected to radially applied forces due to vibrations. It is a further object of the invention to provide a bearing limiting device so arranged as to limit the deformation of the torsion bars due to vibrations and high accelerations, permitting the gyro to function without lockup.

Another object of the invention is to provide in such a device novel helical slotted torsion bars in which the helical slots are made of a width so arranged as to act as a limiting stop to torsional deflection (small angles) while permitting axial contraction and expansion of the torsion bars within an operating range limited by the width of such slots.

Another object of the invention is to provide the slots of said torsion bars with a circular hole at each end thereof so as to strengthen the structure and provide better stress distribution.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

In the drawings:

FIGURE 1 is an enlarged side view of one of the novel helical slotted torsion bars.

FIGURE 2 is a sectional view of FIGURE 1 taken along the lines 2—2 and looking in the direction of the arrows.

FIGURE 3 is a sectional view of a rate gyroscope assembly with a pair of the novel helical slotted torsion bars in assembled relation.

FIGURE 4 shows a modified form of the torsion bar having simplified straight cut or angular slots and which modified form of torsion bars may be used in the rate gyroscope assembly of FIGURE 3 instead of the helical slotted torsion bars shown therein.

Referring to the drawing of FIGURE 3, a device embodying the present invention is shown as including a casing 5 of generally cylindrical form having attached to one end a cap 7 and mounted within the casing 5 end plates 9 and 10 for supporting the output shafts of a gyro indicated generally by the numeral 11 and angularly movable about the precession axis 12—12 of the gyro, as hereinafter explained.

A rotor case or gimbal 14 for the gyro 11 is disposed in a central portion of the casing 5 and has rotatably mounted therein a gyro rotor 16 carried by bearings 18 mounted on a shaft 20 and driven by a suitable electric motor 22 supported within the rotor case or gimbal 14. The rotor shaft 20 is supported at opposite ends by split upper and lower sections 23 and 24 of the casing 14.

Output shafts 26 and 28 are disposed at opposite ends of the gimbal 14 and are in turn supported at the opposite ends thereof by novel slotted torsion bars 30 and 32 of substantially identical structure formed of spring steel, beryllium copper or other suitable spring metal and which torsion bars may be of the type shown in detail in FIGURE 1 or of the type shown in detail in FIGURE 4, as explained hereinafter.

As shown in FIGURE 3, the slotted torsion bar 32 is screw threadedly engaged at 35 in the end of the shaft 28 while the opposite end of the torsion bar 32 is screw threadedly engaged at 37 in the mounting plate 10 and secured thereto by a fastening nut 39.

Similarly the torsion bar 30 is screw threadedly engaged at 41 in the end of the shaft 26 while the opposite end of the torsion bar 30 is screw threadedly engaged at 42 in the mounting plate 9 and secured thereto by a fastening nut 43.

Further mounted on the output shaft 26 is a rotor element 50 cooperating with a stator element 52 of a synchro or output signal generator 53, of conventional type. The stator element 52 of the synchro 53 is affixed to the casing 5 and has stator windings 54 in which may be generated an output signal upon a rotational deflection of the output shaft 26 by the gyro in a clockwise or counterclockwise sense, corresponding to a rate of turn of the aircraft in which the gyro is mounted.

Further secured to the opposite output shaft 28 by a screw 60 is a drag cup 62 of suitable electromagnetic material. The drag cup 62 protrudes into a magnetic flux gap produced by a permanent magnet 64 carried by an end plate 66 and cooperates therewith so as to dampen the oscillations of the gimbal assembly 14. The end plate 66 is suitably affixed to the casing 5.

As shown in FIGURE 3, the gimbal 14 is normally supported in centralized relation by the torsion bars 30 and 32 while roller bearing assemblies 70 and 72 are mounted in end plates 9 and 66 and positioned in spaced relation at 73 and 75 to the torsion bars 30 and 32, respectively, so as to provide means for limiting radial deflection of the gimbal 14. The bearings 70 and 72 serving upon such limited radial deflection to reduce the stress on the torsion bars 30 and 32 due to deflection while preventing lockup in the signal generating device between the rotor 50 and stator 52 under high "g" and extreme vibratory operating conditions. The torsion bars 30 and 32 under normal operating conditions are not supported by the bearing assemblies 73 and 75, but instead freely support the gyro casing 14, as shown in FIGURE 3.

*Novel slotted torsion bars*

The torsion bars 30 and 32, as heretofore explained, are of substantially identical structure and may be of a type shown in detail in FIGURE 1 or of a somewhat more simplified form shown in FIGURE 4. In the form of the slotted torsion bar of FIGURE 1, there is provided a tubular member 80 having formed therein a plurality of helical slots 82 extending through the tubular member 80 and made of a proper width so as to act as a limiting stop to torsional deflection (small angles) of the tubular member 80 in one sense as upon rotary movement being imparted to the output shafts 26 and 28 on operation of the gyro 11 indicative of a turn of an aircraft.

Formed at the opposite ends of the helical slots 82 are round holes or openings 84 extending through the wall of the tubular member 80. The round holes 84 at the end of the respective helical slots 82 provide for better stress distribution and thereby tend to strengthen the structure of the helical slotted tubular member 80. At the opposite ends of the tubular member 80 are affixed screw threaded fastening members 86 and 88.

The screw threaded member 86 may serve in the case of the torsion bar 30 to fasten the bar 30 at 42 to the end plate 9 and in the case of the torsion bar 32 the member 86 may serve to fasten the bar 32 at 37 to the end plate 10. Similarly the screw threaded member 88 may serve in the case of the torsion bar 30 to fasten the bar 30 at 41 to the output shaft 26 and in the case of the torsion bar 32 the member 88 may serve to fasten the bar at 35 to the output shaft 28.

In the modified form of the torsion bar shown in FIGURE 4, corresponding numerals indicate corresponding parts to those heretofore described with reference to FIGURE 1. In the torsion bar of FIGURE 4 a simplified form of straight cut or angular slots 90 extend through the wall of the tubular member 80 instead of the more complex structure of the helical slots 82 with round openings 84 at the opposite ends thereof, as heretofore explained with reference to FIGURE 1.

As shown in the form of the invention illustrated in FIGURE 3, the torsion bars 30 and 32 are fastened at the opposite ends of the output shafts 26 and 28 and are in turn secured at their outer ends to the end plates 9 and 10 respectively. The slot arrangement of the respective torsion bars 30 and 32 are arranged in opposed relation so that upon a rotary deflection of the output shaft 26 by the gyro 11 in a direction tending to wind the torsion bar 30 in a sense to open the helical slots 82 formed therein there will be effected an axial expansion of the torsion bar 30. Such movement of the gyro 11 will in turn impart a corresponding rotary deflection of the opposite output shaft 28 causing the opposing torsion bar 32 to wind in a sense tending to close or contract the respective helical slots 82 formed therein and to effect an axial contraction of the torsion bar 32.

Upon rotary deflection of the output shaft 26 by the gyro 11 in an opposite direction tending to wind the torsion bar 30 in a sense to cause the respective helical slots 82 in the torsion bar 30 to close or contract, there will be effected an axial contraction of the torsion bar 30. Moreover the corresponding rotary deflection of the opposite shaft 28 by such movement of the gyro 11 will in turn wind the torsion bar 32 in a sense to cause the helical slots 82 in the torsion bar 32 to open to in turn effect an axial expansion of the torsion bar 32.

The foregoing compensating action of the one torsion bar in relation to the other provides an arrangement in which there is applied by the respective torsion bars 30 and 32 a constant tension force over the small angular displacements effected by the operation of the rate gyro 11 so that as the one torsion bar tends to increase in length the other torsion bar is effectively decreased in a length an equal amount.

Furthermore, the width of the respective helical slots 82 is such that the helical slots 82 in the bar 30 act as a limiting stop to a rotary torsional deflection by the gyro 11 (small angles) in one sense while the helical slots 82 in the bar 32 act as a limiting stop to a rotary torsional deflection by the gyro 11 in an opposite sense. In so acting, the helical slots 82 permit an axial contraction and expansion of the respective bars 30 and 32 as well as the torsional deflection of the bars 30 and 32 within an operating range limited by the width of such slots.

Furthermore, since the torsion bars 30 and 32 may be rotationally deformable, the same may be deformable to a small degree when subject to radially applied forces due to vibrations. The bearing assemblies 70 and 72 normally positioned in spaced relation at 73 and 75 to the respective torsion bars 30 and 32 provide a means to limit the deformation of the torsion bars due to such vibrations and high accelerations so as to permit the rate gyro 11 to function under such conditions without lockup of the signal generator device 53.

The modified form of the torsion bar shown in FIGURE 4 may similarly be mounted in the assembly of FIGURE 3 to provide a like mode of operation.

Although only two embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a gyroscopic device of a type including a rotor case, and means for resiliently supporting the rotor case relative to a fixed frame; the improvement in which said supporting means comprises a pair of torsional spring members affixed at outer ends thereof to said frame and at inner ends to said rotor case so as to permit a limited range of rotational movement of said rotor case relative to said frame, said spring members including means to effect axial expansion and contraction of said spring members upon said rotational movement of said rotor case, and said spring members being operatively connected in opposing relation so that rotational movement of said rotor case in one sense causes said last mentioned means to impart an axial contraction to one and an axial expansion to the other of said spring members while a rotational movement of said rotor case in an opposite sense causes an axial contraction of said other spring member together with an axial expansion of said one spring member so as to resiliently support said rotor case under a substantially constant tension applied by said pair of torsional spring members.

2. A device as defined by claim 1 in which said torsional spring members each include a tubular member having a plurality of slots provided therein so arranged as to permit the tubular member to wind in one sense so as to close the slots to effect an axial contraction of said tubular member and to wind in an opposite sense so as to open the slots to effect an axial expansion of said tubular member, and the tubular members of said spring members being operatively connected between the rotor case and frame in opposing relation so that rotational movement of said rotor case causes one of said tubular members to axially expand while causing the other of said tubular members to axially contract, and the slots of said tubular members being such as to limit by the closure thereof the rotational movement of the rotor case to within a predetermined angular range.

3. The combination defined by claim 2 including bearing means carried by said fixed frame and mounted in spaced relation to said tubular members for permitting limited radial deformation of said tubular members free of said bearing means, and said bearing means being arranged to contact said tubular members for limiting the radial deformation thereof under excessive vibratory conditions so as to permit the gyroscopic device to function under such conditions free of mechanical lockup.

4. In a gyroscopic device of a type including a rotor case, a fixed frame, and means for resiliently supporting the rotor case relative to the frame for angular movement about a precession axis of the rotor case; the improvement in which said supporting means comprises a pair of tubular members affixed at the outer ends thereof to said frame and at the inner ends to opposite sides of said rotor case, said tubular members having provided therein helical slots of a predetermined width and so arranged as to effect upon angular movement of the rotor case about said precession axis a decrease in the width of the helical slots in one of said tubular members and an increase in the width of the helical slots in the other of said tubular members so as to simultaneously effect a decrease in the axial length of the one tubular member and an increase in the effective axial length of the other tubular member, and the width of the helical slots in said tubular members being such as to limit upon closure thereof the range of angular movement of the rotor case about the precession axis thereof.

5. In a rate gyroscopic device of a type including a rotor case, a fixed frame, means for resiliently supporting the rotor case relative to the frame for angular movement about a precession axis of the rotor case and including a pair of output shafts at opposite sides of the rotor case, signal generating means operatively connected to one of said output shafts and damping means operatively connected to the other of said output shafts; the improvement in which said supporting means comprises a pair of tubular torsion bars, one of said tubular torsion bars having one end thereof affixed to said frame and an opposite end connected to an end of one of said output shafts, the other of said tubular torsion bars having one end thereof affixed to said frame and the opposite end connected to an end of the other of said output shafts, each of said tubular torsion bars having provided therein helical slots of a predetermined width with round holes opening at opposite ends of the helical slots for distribution of stresses applied to the tubular torsion bars, said helical slots being so arranged in said tubular torsion bars as to effect upon angular movement of the rotor case about said precession axis a decrease in the width of the helical slots in one of said tubular torsion bars and an increase in the width of the helical slots in the other of said tubular torsion bars so as to simultaneously effect a decrease in the axial length of the one tubular torsion bar and an increase in the effective axial length of the other tubular torsion bar, and the width of the helical slots in said tubular torsion bars being such as to limit upon closure thereof the range of angular movement of the rotor case about the precession axis thereof.

6. In a rate gyroscopic device of a type including a rotor case, a fixed frame, means for resiliently supporting the rotor case relative to the frame for angular movement about a precession axis of the rotor case and including a pair of output shafts at opposite sides of the rotor case, signal generating means operatively connected to one of said output shafts and damping means operatively connected to the other of said output shafts; the improvement in which said supporting means comprises a pair of tubular torsion bars, one of said tubular torsion bars having one end thereof affixed to said frame and an opposite end connected to an end of one of said output shafts, the other of said tubular torsion bars having one end thereof affixed to said frame and the opposite end connected to an end of the other of said output shafts, each of said tubular torsion bars having provided therein helical slots of a predetermined width, said helical slots being so arranged in said tubular torsion bars as to effect upon angular movement of the rotor case about said precession axis a decrease in the width of the helical slots in one of said tubular torsion bars and an increase in the width of the helical slots in the other of said tubular torsion bars so as to simultaneously effect a decrease in the axial length of the one tubular torsion bar and an increase in the effective axial length of the other tubular torsion bar.

7. In a rate gyroscopic device of a type including a rotor case, a fixed frame, means for resiliently supporting the rotor case relative to the frame for angular movement about a precession axis of the rotor case and including a pair of output shafts at opposite sides of the rotor case, signal generating means operatively connected to one of said output shafts and damping means operatively connected to the other of said output shafts; the improvement in which said supporting means comprises a pair of tubular torsion bars, one of said tubular torsion bars having one end thereof affixed to said frame and an opposite end connected to an end of one of said output shafts, the other of said tubular torsion bars having one end thereof affixed to said frame and the opposite end connected to an end of the other of said output shafts, each of said tubular torsion bars having provided therein helical slots of a predetermined width, said helical slots being so arranged in said tubular torsion bars as to effect upon angular movement of the rotor case about said precession axis a decrease in the width of the helical slots in one of said tubular torsion bars and an increase in the width of the helical slots in the other of said tubular torsion bars so as to simultaneously effect a decrease in the axial length of the one tubular torsion bar and an increase in the effective axial length of the other tubular torsion bar, and a pair of roller bearing assemblies carried by said frame, one of said roller bearing assemblies being positioned about and in spaced relation to one of said tubular torsion bars, and the other of said roller bearing assemblies being positioned about and in spaced relation to the other of said tubular torsion bars so as to permit limited radial deformation of the tubular torsion bars under excessive vibratory conditions while effectively supporting the tubular torsion bars under high accelerational conditions so as to prevent mechanical lockup of the signal generating means and damping means operatively connected to the respective output shafts of the rotor case.

References Cited in the file of this patent
UNITED STATES PATENTS

| | | |
|---|---|---|
| 1,797,913 | Henderson | Mar. 24, 1931 |
| 2,620,668 | Lundberg | Dec. 9, 1952 |
| 2,800,024 | Lear et al. | July 23, 1957 |
| 2,809,029 | Christoph | Oct. 8, 1957 |
| 2,909,064 | Schoeppel et al. | Oct. 20, 1959 |